US006859896B2

(12) United States Patent
Apperley et al.

(10) Patent No.: US 6,859,896 B2
(45) Date of Patent: Feb. 22, 2005

(54) ADAPTER AND METHOD FOR HANDLING ERRORS IN A DATA STORAGE DEVICE CONVERTED TO BE ACCESSIBLE TO MULTIPLE HOSTS

(75) Inventors: Norman Apperley, Chandlers Ford (GB); Stephen Peter Legg, Southhampton (GB); Richard Rolls, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 506 days.

(21) Appl. No.: 10/115,841

(22) Filed: Apr. 2, 2002

(65) Prior Publication Data

US 2004/0078707 A1 Apr. 22, 2004

(51) Int. Cl.⁷ ............................................. G06F 11/00
(52) U.S. Cl. .............................. 714/48; 714/5; 714/9; 714/42; 710/71; 710/74
(58) Field of Search ......................... 714/5, 9, 42, 48, 714/54; 710/71, 74

(56) References Cited

U.S. PATENT DOCUMENTS

| | | | | |
|---|---|---|---|---|
| H000696 H | * | 10/1989 | Davidson | 710/46 |
| 5,206,946 A | * | 4/1993 | Brunk | 710/2 |
| 5,548,795 A | * | 8/1996 | Au | 710/52 |
| 5,687,390 A | * | 11/1997 | McMillan, Jr. | 710/5 |
| 6,122,723 A | * | 9/2000 | Day et al. | 712/29 |
| 6,363,441 B1 | * | 3/2002 | Bentz et al. | 710/58 |
| 6,748,469 B1 | * | 6/2004 | Caldwell et al. | 710/71 |

OTHER PUBLICATIONS

"Control Unit Timeout for Interface", 19930701, IBM Technical Disclousre Bulletin, vol. 36, Iss. 7, pp. 75–78.*

* cited by examiner

Primary Examiner—Robert Beausoliel
Assistant Examiner—Gabriel L. Chu
(74) Attorney, Agent, or Firm—Lewis Nunnelley

(57) ABSTRACT

An adapter for converting an interface of a data storage device is provided. The adapter includes a first interface for connection to the interface of the data storage device and a second interface for connection to a plurality of host systems. The first interface may be an ATA or SCSI interface and the second interface may be a SSA or FC-AL interface suitable for attachment to multiple host systems. Conversion means are provided by the adapter for converting commands and data between the first and second interfaces. The adapter also has means for sorting commands and data to and from the plurality of host systems. The adapter acts as a single host system for the data storage device and includes means for retrieving error information from the data storage device in the event of a command terminating in an error. The adapter also comprises means for entering an error handling state with one of the plurality of host systems that persists until terminated by the host system and means for transferring the retrieved error information to the host system.

16 Claims, 3 Drawing Sheets

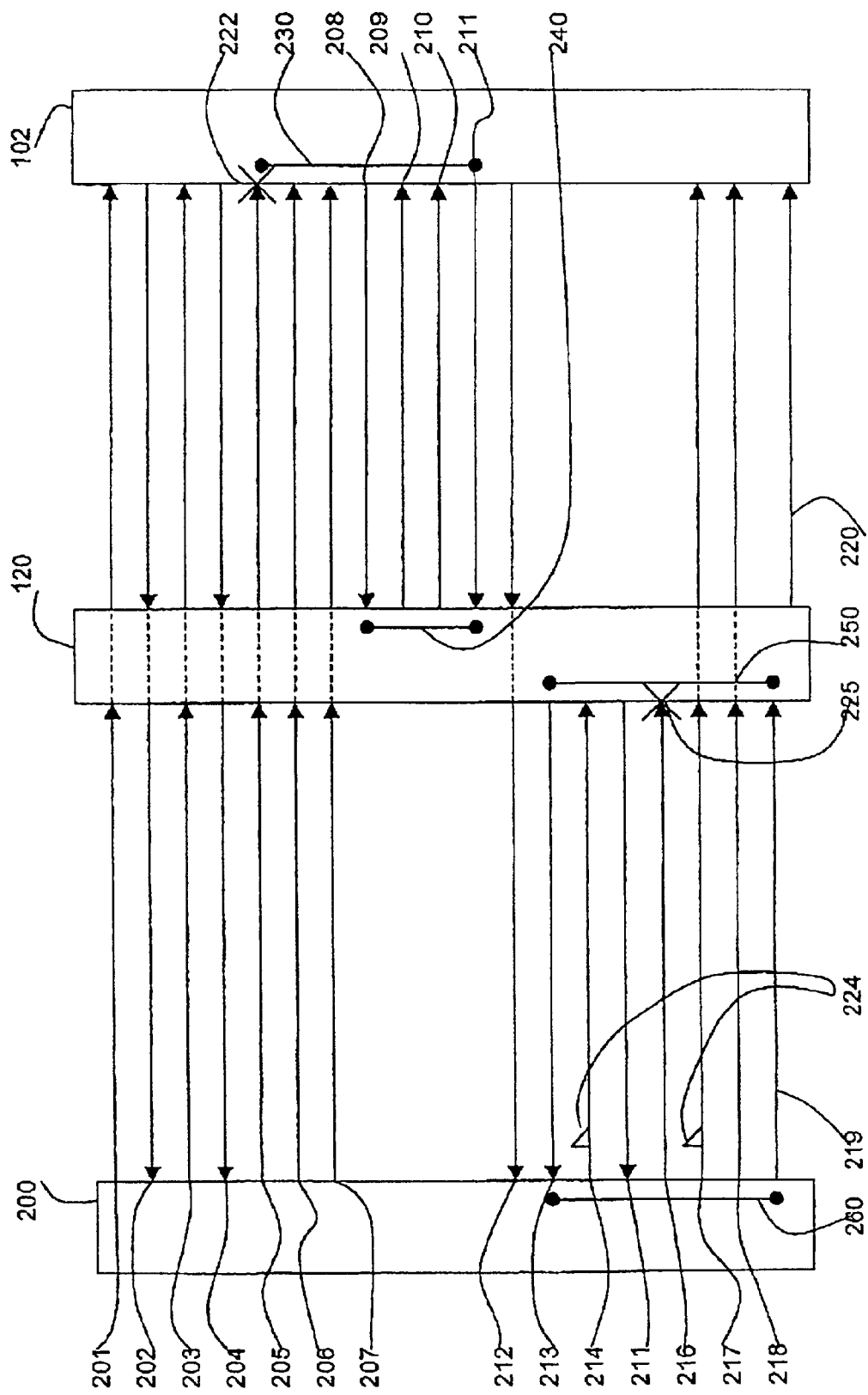

ADAPTER AND METHOD FOR HANDLING ERRORS IN A DATA STORAGE DEVICE CONVERTED TO BE ACCESSIBLE TO MULTIPLE HOSTS

FIELD OF INVENTION

This invention relates in general to interfaces between computers and peripheral data storage devices and more particularly to an adapter and a method for handling errors in a data storage device converted to be accessible to multiple hosts on a serial interface.

BACKGROUND OF THE INVENTION

Low cost or commodity disk drives are predominantly used with single host systems. Popular disk drive interfaces for such low cost disk drives include, for example, SCSI (Small Computer System Interface) or ATA (Advanced Technology or AT Attachment). These disk drives may have a very high capacity and have high performance characteristics when attached to a single system.

The majority of commodity disk drives only attach to a single host system with a simple interface that does not enable the disk drive to be used where access is required from multiple host systems. The ATA interface can only attach a disk drive to a single host system. The SCSI interface architecturally permits multiple host systems at the expense of reducing the number of disks possible. Usually, SCSI interfaces are used on single host systems or, at the most, with two host systems.

Such attachment interfaces to commodity disk drives have limitations when used for high function, high availability systems.

One interface choice for multiple host systems is SSA (Serial Storage Architecture) which is designed for multiple host systems on the same loop and includes functions to retain availability of the network when systems or disks fail. With SSA, malfunctioning systems can be excluded to permit all the other systems to continue operation. SSA networks are cabled as a loop, so any failure of a disk drive will not prevent all the systems from continuing to operate to all the other disk drives. To improve performance in SSA, data is sent on separate wires from those used to receive data. Data can therefore be sent and received concurrently by any node. Another example of an interface which supports multiple hosts is the FC-AL (Fibre Channel Arbitrated Loop) interface.

The current solution to the requirement of connection of disk drives to multiple hosts is to use a special disk drive with a native SSA or FC-AL interface. Such so called native disk drives are made in much lower volumes than commodity disk drives and they are only available from a few suppliers, so they cost significantly more. A native disk drive also requires development resources for each new generation of recording technology and therefore the availability date of such disk drives tends to lag behind commodity disk drives.

Error handling is a function which is different when devices are attached to a single host or to multiple hosts and also when attached to a serial interface rather than a parallel one. An adapter that is added to a single host disk drive (e.g. an ATA disk) to enable that drive to then attach to a multiple host interface has to perform error handling functions expected on a multiple host disk (e.g. an SSA disk) with the limitations of how error handling is performed on a single host disk. Even if the disk drive has a SCSI interface, the adapter that connects this to a multiple host SSA interface has to perform error handling functions expected on a multiple host disk. This is because even though the SCSI interface is architectured to support multi-host attachments, when a SCSI disk is attached to the adapter, the SCSI disk sees only one host i.e. the adapter, so its error handling is limited to single host operations even though the commands it receives came from multiple SSA hosts.

SSA is a serial interface in which data messages can be sent to a disk at the same time as data or messages can be received from the disk. This is unlike SCSI architecture where the bus is only used for one operation at a time, so a SCSI adapter is able to decide what to send next after receipt of a completion message of a command.

In SCSI architecture, when an error is detected performing a command, a "Check Condition" status is returned to the initiator that sent the command. The disk remains in an allegiance condition to that initiator until it receives the next command from that initiator. In SCSI, the next command will always be a "Request Sense" command that retrieves details of the error. This simple error handling is possible because SCSI is a bi-directional parallel interface, the initiator can always ensure that the next command sent by the initiator will be the "Request Sense" command.

In SSA architecture, when an error is encountered by a disk in a multiple host system, the disks stop talking to the host from which the command originated. The disks can carry on talking to the other hosts.

Unlike in SCSI architecture, in SSA architecture, the initiator cannot guarantee that the next command will be the "Request Sense" command because commands are sent asynchronously with status being returned by disks. Separate serial cables are used for outgoing and incoming data and messages. The initiator cannot guarantee that the next command received by the disk will be the "Request Sense" command as it may already have sent another command to that disk that has not yet arrived at the disk when the disk sent its status message. In SSA therefore, a concept of contingent allegiance is required. The term "contingent allegiance" describes an error handling state entered by a disk with an initiator when a disk encounters an error and the state persists until terminated by the initiator when error handling procedures have been completed. When a disk returns "Check Condition" status to a command that terminated in error, the disk enters a contingent allegiance state to that initiator. The initiator enters the same state for that disk when it receives the "Check Condition" status.

The disk drive remains in this state of contingent allegiance until a message is received from the initiator to terminate the contingent allegiance state. Whilst in the contingent allegiance state, the disk drive can only execute commands that are flagged as executable whilst in the contingent allegiance state. The initiator can therefore retrieve sense data by issuing a "Request Sense" command flagged as executable whilst in the contingent allegiance state. The initiator actually issues all commands required for error recovery as being flagged as executable when in contingent allegiance state. When the initiator terminates the contingent allegiance condition, the disk drive starts to execute commands it has queued for the same initiator.

It is desirable to enable a low cost, commodity disk drive to be connected to multiple hosts using an interface that has better availability and performance characteristics than SCSI or ATA and can attach to multiple hosts that is not possible using ATA. An adapter in the form of an interposer card can be used to connect a commodity disk drive to a different interface that has a higher function capability than is available with the interface native to the disk drive.

DISCLOSURE OF THE INVENTION

It is an aim of the present invention to provide means for converting commodity low cost disk drives to an interface which provides increased availability and performance, including handling errors from the multiple host systems on a serial interface.

The embodiments described herein use the examples of disk drives with SCSI interfaces being converted to SSA interfaces; however, the invention is not limited to these specific types of interface. The disclosure should be understood to include conversion between any interface that retains the allegiance only until the next command is received and any interface that permits commands to be received during the allegiance to a host after an error is reported. In a serial interface such as SSA, commands can be sent from a host at the same time as an error to a previous command is sent from a disk because separate wires are used to send and receive information. When the disk enters an allegiance state for a host after an error, it only executes commands from that host that are flagged as executable in this state and rejects those not flagged as executable until the allegiance state is terminated by a message from the host. In a parallel interface such as SCSI, the allegiance to the host that sent the command that terminated in error is terminated on receipt of the next command. As this conversion involves an adapter between the two interfaces, the disk drive that attaches to the adapter is now controlled by a single host (the adapter), so the adapter has to support all the functions required for multiple hosts rather than the disk drive supporting these functions.

According to a first aspect of the present invention there is provided an adapter for converting an interface of a data storage device, the adapter comprising: a first interface for connection to the interface of the data storage device; a second interface for connection to a plurality of host systems; conversion means for converting commands and data between the first and second interfaces; means for sorting commands and data to and from the plurality of host systems; wherein the adapter acts as a single host system for the data storage device and includes means for retrieving error information from the data storage device in the event of a command terminating in an error, and the adapter also comprises means for entering an error handling state with one of the plurality of host systems that persists until terminated by the host system and means for transferring the retrieved error information to the host system.

The first interface may be a parallel interface, for example an ATA or SCSI interface. The second interface may be a serial multiple host interface, for example a SSA or a FC-AL interface.

The adapter may enter an allegiance state to the data storage device whilst retrieving the error information. The adapter may send a command to the data storage device to abort any other commands from a host system whose command resulted in an error and, once the error processing is complete, the adapter may re-submit the aborted commands to the data storage device.

The adapter may act as an intermediary for error information between the data storage device and the host system whose command resulted in the error.

The commands from the plurality of host systems other than the host system whose command resulted in the error may continue to be converted by the adapter and may be executed by the data storage device during an error handling state.

During an error handling state only commands identified as executable from the host whose command resulted in an error may be executed between the entities in the error handling state.

According to a second aspect of the present invention there is provided an apparatus for handling errors in a data storage device converted to be accessible to multiple hosts, the apparatus comprising: a data storage device with an interface of a first type; a plurality of host systems all with interfaces of a second type; an adapter having a first interface of the first type for connection to the interface of the data storage device and a second interface of the second type for connection to the plurality of host systems; the adapter also having: conversion means for converting commands and data between the first and second interfaces; and means for sorting commands and data to and from the plurality of host systems; wherein the adapter acts as a single host system for the data storage device and includes means for retrieving error information from the data storage device in the event of a command terminating in an error, and the adapter also comprising means for entering an error handling state with one of the plurality of host systems that persists until terminated by the host system and means for transferring the retrieved error information to the host system.

According to a third aspect of the present invention there is provided a method for handling errors in a data storage device converted to be accessible to multiple hosts, the method comprising: providing an adapter between a data storage device with a first type interface and a plurality of host systems with a second type interface; the adapter converting commands and data to and from the host systems between the first and second type interfaces; the adapter sorting the commands and data to and from the plurality of host systems; wherein the adapter acts as a single host system for the data storage device and retrieves error information from the data storage device in the event of a command terminating in an error, and the adapter enters an error handling state with one of the plurality of host systems that persists until terminated by the host system and transfers the retrieved error information to the host system.

In the event of a command from a first host system resulting in an error, the adapter may enter an allegiance state with the data storage device.

The adapter may send a command to the data storage device to abort any other commands from a first host system whose command resulted in an error and, once the error processing is complete, the adapter may re-submit the aborted commands to the data storage device.

The adapter may act as an intermediary for error information between the data storage device and the host system whose command resulted in the error.

The commands from the plurality of host systems other than the host system whose command resulted in the error may continue to be converted by the adapter and may be executed by the data storage device during an error handling state.

During an error handling state between the adapter and a first host system whose command resulted in an error, only commands identified as executable from the first host system may be executed and all commands from the other host systems may be executed.

BRIEF DESCRIPTION OF THE DRAWINGS

An embodiment of the invention is now described, by way of example only, with reference to the accompanying drawings in which:

FIG. 1b is a detail of FIG. 1a; and,

FIG. 2 is a schematic diagram of command transfer in a method and apparatus in accordance with the present invention.

DESCRIPTION OF THE PREFERRED EMBODIMENTS

Figure 1A:
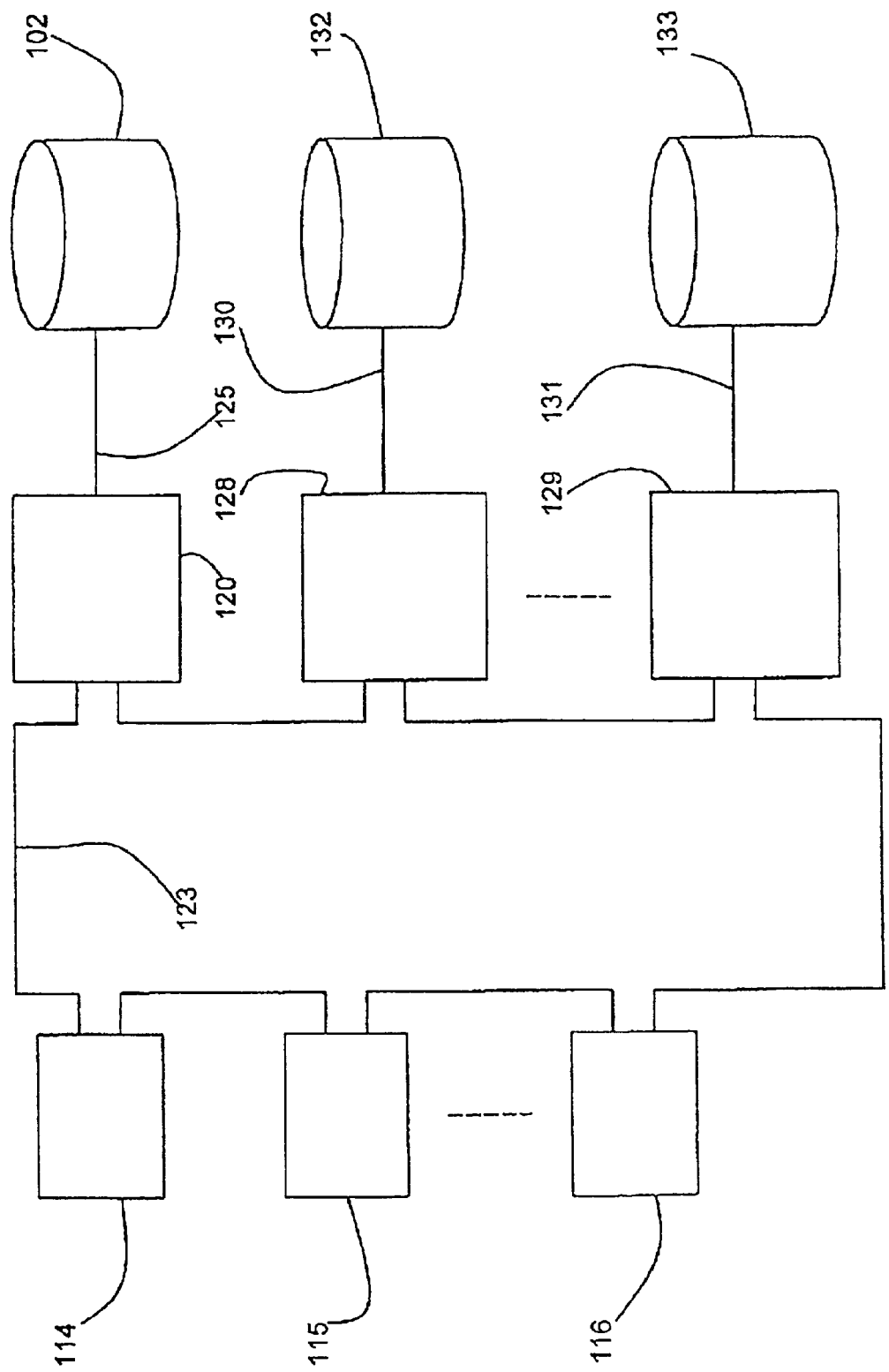
FIG. 1a is a block diagram of an apparatus in accordance with the present invention.

Referring to FIG. 1a, an apparatus is described with multiple host computers 114, 115, 116 with interfaces connected by means of a serial bus which in this example is a serial bus in a loop architecture which transmits using SSA protocol. Also provided on the SSA loop 123 is a plurality of disk drives 102, 132, 133. Each disk drive 102, 132, 133 has an interface in the form of an ATA or SCSI interface. Each disk drive 102, 132, 133 has an adapter 120, 128, 129 which is attached between the disk drive 102, 132, 133 and the SSA loop 123. The interfaces of the disk drives 102, 132, 133 are connected to the adapters by means of buses 125, 130, 131 which transmit using the protocol of the disk drives 102, 132, 133.

Figure 1B:
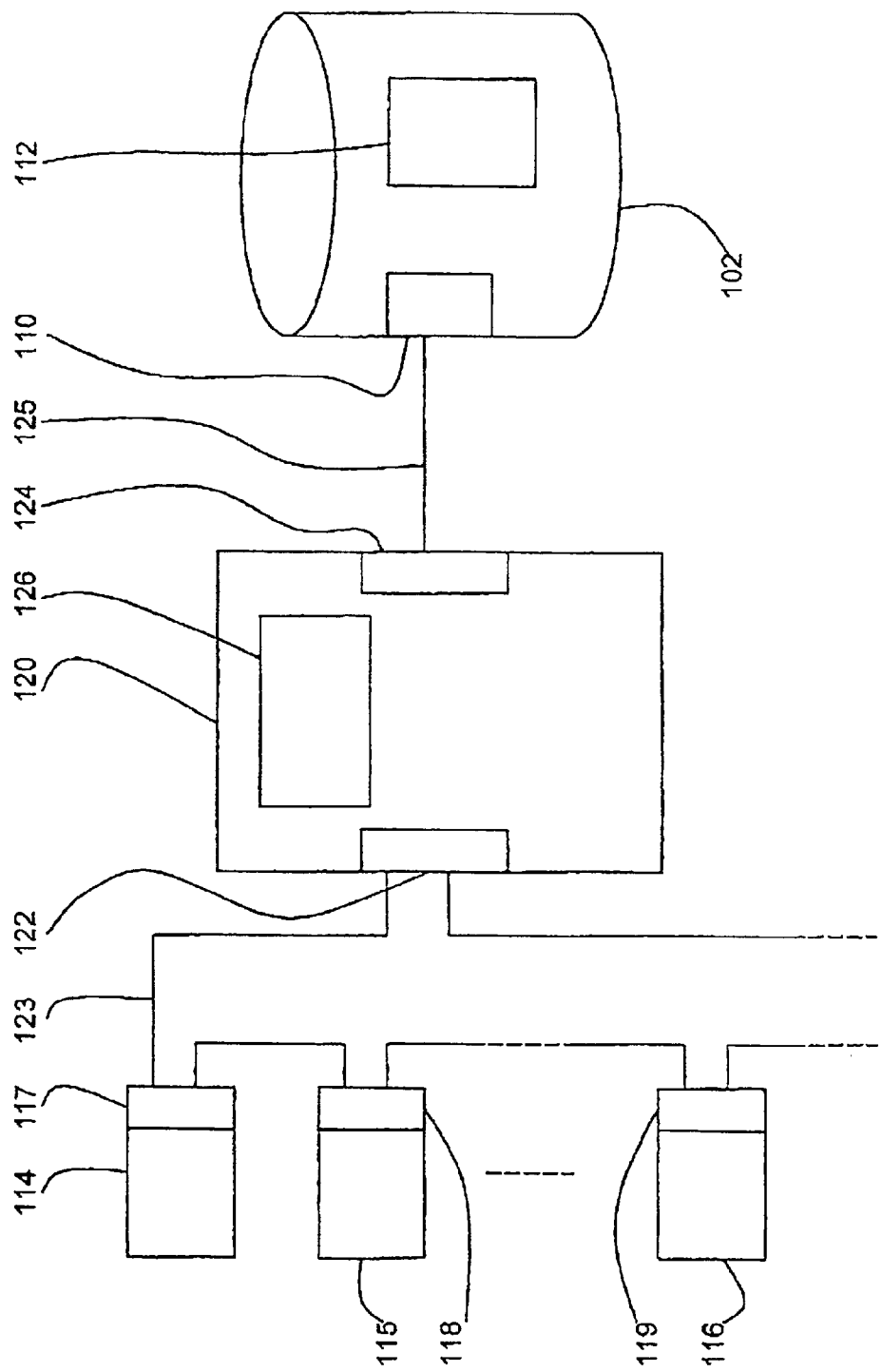

FIG. 1b is a detail of one disk drive 102 and adapter 120 of FIG. 1a. The disk drive 102 has a queue 112 for queuing commands to be executed. The disk drive 102 has an interface 110. In this described embodiment, the interface 110 of the disk drive 102 is a SCSI interface.

A plurality of host computers are provided which will be referred to as initiators 114, 115, 116. Each initiator 114, 115, 116 has an interface 117, 118, 119 suitable for supporting multiple hosts and multiple disk drives. In this described embodiment, the initiators 114, 115, 116 have SSA interfaces 117, 118, 119.

An adapter 120 is provided for converting the SSA interfaces 117, 118, 119 of the multiple initiators 114, 115, 116 to the SCSI interface 110 of the disk drive 102.

The adapter 120 has a SSA interface 122 which is connected to the initiators 114, 115, 116 by means of a SSA bus 123 which transmits SSA protocol. The SSA bus 123 has separate serial cables for outgoing and incoming data and messages. The adapter 120 also has a SCSI interface 124 which is connected to the disk drive 102 via a SCSI bus 125 which is a bi-directional parallel connection. The adapter 120 has a processor 126 that remembers what commands have been sent to the disk drive 102 and which initiator 114, 115, 116 each command came from.

The adapter 120 is attached to the disk drive 102 through a SCSI or ATA connector. The initiators 114, 115, 116 are connected to the SSA interface 122 of the adapter 120 as though it were an interface of a disk drive.

SSA commands received by the adapter 120 from the initiators 114, 115, 116 are processed by the adapter 120 to convert the SSA commands to SCSI commands which are forwarded to the disk drive 102. The adapter 120 retains information regarding the commands sent by each initiator 114, 115, 116. Information from the disk drive 102 is sent to the adapter 120 in the form of SCSI messages and data and the adapter 120 processes these and converts them to SSA messages and data which are sent to the relevant initiator 114, 115, 116. The relevant initiator 114, 115, 116 is identified by the adapter 120 from the retained information regarding the originating command.

In this way, a disk drive 102 that is only designed to attach to a single host system (e.g. ATA) can be connected to an interface 122 designed to attach to multiple host systems. A disk drive 102 designed to attach to multiple host systems (e.g. SCSI) attached through an adapter to enable the performance and availability characteristics of a given interface (e.g. SSA) can also attach to multiple host systems. The SCSI disk drive 102 in this configuration only sees a single host system i.e. the adapter 120. The adapter 120 uses an interposer card between the interface 110 of the disk drive 102 and the initiator interfaces 117, 118, 119. The adapter 102 contains hardware and firmware that converts from the interface protocol of the initiator interfaces 117, 118, 119 to the protocol of the disk drive interface 110.

The adapter 120 has to perform some functions due to the multiple hosts in the form of the initiators 114, 115, 116 because the disk drive 102 is only attaching to a single host i.e. the adapter 120. One of these functions is that the adapter must retain the state of the disk drive 102 separately for each initiator.

In the described embodiment in which the host interface is SSA, the adapter 120 remembers which system it has informed via Unit Attention sense data of a change of state of the disk drive 102 e.g. powered on, reset complete, mode parameters changed, etc. It informs each initiator 114, 115, 116 separately of the change of state of the disk drive 102.

Error handling is a function which is different when the disk drive is attached to a single host or to multiple hosts.

In SCSI architecture, when an error is detected by a disk drive performing a command, a "Check Condition" status is returned for the initiator that sent the command. The disk remains in an allegiance condition to that initiator until it receives the next command from that initiator which will be the "Request Sense" command.

In SSA architecture, the initiator cannot guarantee that the next command will be the "Request Sense" command because commands are sent asynchronously with status being returned by disks. The initiator cannot guarantee that the next command received by the disk will be the "Request Sense" command as it may already have sent another command to that disk that has not yet arrived when the disk sent its status message. In SSA therefore, a concept of contingent allegiance is required. In this, when a disk returns "Check Condition" status to a command that terminated in error, the disk enters a contingent allegiance state to that initiator. The initiator enters the same state for that disk when it receives the "Check Condition" status.

The disk drive remains in this state of contingent allegiance until a message is received from the initiator to terminate the contingent allegiance state. Whilst in the contingent allegiance state, the disk drive can only execute commands that are flagged as executable whilst in the contingent allegiance state. The initiator can therefore retrieve sense data by issuing a "Request Sense" command flagged as executable whilst in the contingent allegiance state. The initiator actually issues all commands required for error recover as being flagged as executable when in contingent allegiance state. When the initiator terminates the contingent allegiance condition, the disk drive starts to execute commands it has queued for the same initiator.

There are two problems with error handling required by a high function interface (i.e. a SSA interface) that have to be solved in the adapter 120 between the single host disk drive 102 (SCSI disk) and the multiple host interface 122 (SSA interface) to allow a single host disk drive 102 to attach to a higher function interface such as a SSA interface.

Firstly, the disk drive 102 is only aware of a single host (the adapter 120) on the SCSI bus 125. On the SSA bus 123 there may be eight host initiators 114, 115, 116 and others and each may have commands queued 112 in the SCSI disk drive 102. The allegiance condition of the SCSI disk drive 102 to its SCSI initiator (the adapter 120) terminates when the next command is received by the SCSI disk drive 102 from the adapter 120. The disk drive 102 is then able to start execution of any queued 112 SCSI commands. The SCSI disk drive 102 must not be allowed to execute any commands for the SSA host that issued the command that terminated in error, until that SSA host has obtained the sense data for the error and the SSA host has terminated the contingent allegiance condition for that disk.

Secondly, the SCSI disk drive 102 only has an allegiance to its host (the adapter 120) until it receives the next command. In SSA, an allegiance is required until the initiator 114, 115, 116 that issued the command that terminated in error has issued the "Request Sense" command and all commands required for error recovery.

A method is now described in which the adapter 120 handles errors to overcome the above two problems and to satisfy the requirements of both the SCSI disk drive 102 which sees a single host (the adapter 120) and the multiple initiators 114, 115, 116 connected via the SSA interface 122.

Referring to FIG. 2, the multiple initiators are shown as a single source 200 of commands. The adapter 120 is provided between the initiators 200 and the disk drive 102. Commands are shown between the three entities 200, 120, 102 in a chronological order progressing down the figure.

In this figure, reference is made to an "Initiator 1" which sends a command which results in a error and to the other multiple initiators as "Initiators y".

FIG. 2 shows commands being sent by Initiator 1 before an error arises. Command are sent by Initiator 1 which are represented by command line 201 from Initiator 1 to the disk drive 102 via the adapter 120. Similarly, commands are sent by the other Initiators y which are represented by command line 203 from the Initiators y to the disk drive 102 via the adapter 120. Responses 202, 204 from the disk drive 102 to the commands 201, 203 are returned via the adapter 120 to the commanding initiator.

All commands and responses to the left of the adapter 120 in FIG. 2 are transmitted by SSA protocol asynchronously with separate serial cables used for outgoing and incoming data and messages. All commands and responses to the right of the adapter 120 in FIG. 2 are transmitted by SCSI protocol via a synchronous parallel connector. The conversion of commands and responses in the adapter 120 is illustrated by the dashed portions of the command and response lines 201, 202, 203, 204.

Initiator 1 sends a command 205 which is converted by the adapter 120 and received by the disk drive 102. The disk drive 102 detects an error "X" 222. The disk drive 102 terminates the current command 205 and returns "Check Condition" status 208 to the adapter 120. The disk drive 102 enters an allegiance state 230 for the adapter 120 which it sees to be the result of sending the command 205 which resulted in the error "X" 222. The disk drive 102 leaves the allegiance state when it receives the next command. On receipt of the "Check Condition" status 208, the adapter 120 enters an allegiance state 240 with the disk drive 102.

Meanwhile, Initiator 1 and the other initiators y may have sent other commands 206, 207 to the disk drive 102 via the adapter 120 which are held in a queue in the disk drive 102, awaiting execution by the disk drive 102.

On receipt of the "Check Condition" status 208 at the adapter 120, the adapter 120 sends an abort tag message 209 to the disk drive 102 for each command 206 sent by Initiator 1 that sent the command 205 that was terminated in error. On receipt of each abort tag message 209, the disk drive 102 removes from its command queue the command 206 identified by the tag.

The adapter 120 sends a "Request Sense" command 210 to the disk drive 102 to retrieve and remember the sense data for the error "X" 222. The sense data is returned 211 by the disk drive 102 to the adapter 120. The SCSI disk drive 102 sees the "Request Sense" command 210 as authority to leave the allegiance state 230 for the adapter 120. The disk drive 102 can now continue to execute any commands 207 it has queued by returning responses 212. None of the queued commands 207 is from Initiator 1 as all the queued commands 206 for Initiator 1 were aborted during the allegiance state 230.

The adapter 120 now has knowledge of which command 205 terminated in error and the adapter 120 has saved the sense data 211 for that error that was sent from the disk drive 102. The allegiance 240 of the adapter 120 to the disk drive 102 has now ended.

The adapter 120 now sends "Check Condition" status 213 to Initiator 1 and enters contingent allegiance 250 with Initiator 1. The adapter 120 will reject 225 any commands 216 from Initiator 1 which are not flagged 224 as executable when in the contingent allegiance state. Initiator 1 also enters a contingent allegiance state 260 for the adapter 120.

When Initiator 1 sends a "Request Sense" command 214 flagged 224 as executable when in contingent allegiance state to the adapter 120 for the disk in error, the adapter 120 executes this by sending the sense data 211 that it has already captured from the disk drive 102.

Initiator 1 may send one or more commands 217 whilst performing its error recovery procedure for the disk in error and all of these commands 217 will be flagged 224 as executable whilst the adapter 120 is in the contingent allegiance state 250. The adapter 120 forwards each of these commands 217 to the disk drive 102 for execution by the disk.

Whilst the adapter 120 is in the contingent allegiance state 250, commands 218 from the other Initiators y are processed as normal When Initiator 1 has completed its error recovery procedures, it sends a message 219 to the adapter 120 to terminate the contingent allegiance state 250. On receipt of this message 219, the adapter 120 sends 220 to the disk drive 102 all the commands 206 it aborted following the "Check Condition" status from the disk drive 102.

The adapter 120 is no longer in a contingent allegiance state and the disk drive 102 is no longer in the allegiance state and commands are processed as normal. Whilst the adapter 120 is in a contingent allegiance state, commands from the other Initiators y are executed as normal.

When an error is reported by the disk drive 102 on its interface 110, the adapter 120 handles the error reporting and controls the contingent allegiance 250 to the appropriate initiator. For disk drives that attach to multiple host systems via a serial interface such as SSA, a contingent allegiance state is required between the appropriate host system and the disk drive. This function is emulated by the adapter 120.

The adapter 120 is able to handle contingent allegiance states for the disk drive 102 for all initiators 114, 115, 116 if commands from different initiators fail. The disk drive 102 is unaware that this contingent allegiance to different initiators is being performed or that it is being used by different initiators as the only host the disk drive 102 sees is the adapter 120.

An SSA bus transmits a stream of commands from the multiple initiators with the commands being interleaved. The adapter 120 acts to disentangle the commands from each initiator and, due to this sorting ability, the adapter 120 can handle the error scenarios and contingent allegiance required by the error handling.

The above embodiment has been described for a disk drive; however, other forms of data storage device, for example, tape units, CD-ROM drives, may also be used.

Improvements and modifications can be made to the foregoing without departing from the scope of the present invention.

What is claimed is:

1. An adapter for converting an interface of a data storage device, comprising:
   a first interface for connection to the interface of the data storage device;
   a second interface for connection to a plurality of host systems;
   conversion means for converting commands and data between the first and second interfaces; and,
   means for sorting commands and data to and from the plurality of host systems,
   wherein the adapter acts as a single host system for the data storage device and includes means for retrieving error information from the data storage device in the event of a command terminating in an error, and
   the adapter also comprises means for entering an error handling state with one of the plurality of host systems that persists until terminated by the host system and means for transferring the retrieved error information to the host system.

2. An adapter as claimed in claim 1, wherein the first interface is a parallel interface.

3. An adapter as claimed in claim 1, wherein the second interface is a serial multiple host interface.

4. An adapter as claimed in claim 1, wherein the first interface is an ATA or a SCSI interface and the second interface is a SSA or a FC-AL interface.

5. An adapter as claimed in claim 1, wherein the adapter enters an allegiance state to the data storage device whilst retrieving the error information.

6. An adapter as claimed in claim 1, wherein the adapter sends a command to the data storage device to abort any other commands from a host system whose command resulted in an error and, once the error processing is complete, the adapter re-submits the aborted commands to the data storage device.

7. An adapter as claimed in claim 1, wherein the adapter acts as an intermediary for error information between the data storage device and the host system whose command resulted in the error.

8. An adapter as claimed in claim 1, wherein commands from the plurality of host systems other than the host system whose command resulted in the error continue to be converted by the adapter and executed by the data storage device during an error handling state.

9. An adapter as claimed in claim 1, wherein during a error handling state only commands identified as executable from the host whose command resulted in an error are executed between the entities in the error handling state.

10. An apparatus for handling errors in a data storage device converted to be accessible to multiple hosts, the apparatus comprising:
    a data storage device with an interface of a first type;
    a plurality of host systems all with interfaces of a second type;
    an adapter having a first interface of the first type for connection to the interface of the data storage device and a second interface of the second type for connection to the plurality of host systems;
    the adapter also having conversion means for converting commands and data between the first and second interfaces; and,
    means for sorting commands and data to and from the plurality of host systems,
    wherein the adapter acts as a single host system for the data storage device and includes means for retrieving error information from the data storage device in the event of a command terminating in an error, and
    the adapter also comprising means for entering an error handling state with one of the plurality of host systems that persists until terminated by the host system and means for transferring the retrieved error information to the host system.

11. A method for handling errors in a data storage device converted to be accessible to multiple hosts, comprising:
    providing an adapter connected between a data storage device with a first type interface and a plurality of host systems with a second type interface;
    converting commands and data to and from the host systems between the first and second type interfaces;
    sorting the commands and data to and from the plurality of host systems,
    wherein the adapter acts as a single host system for the data storage device and retrieves error information from the data storage device in the event of a command terminating in an error; and,
    entering an error handling state with one of the plurality of host systems that persists until terminated by the host system and transfers the retrieved error information to the host system.

12. A method as claimed in claim 11, wherein in the event of a command from a first host system resulting in an error, the adapter enters an allegiance state with the data storage device.

13. A method as claimed in claim 12, wherein the adapter sends a command to the data storage device to abort any other commands from a first host system whose command resulted in an error and, once the error processing is complete, the adapter re-submits the aborted commands to the data storage device.

14. An adapter as claimed in claim 11, wherein the adapter acts as an intermediary for error information between the data storage device and the host system whose command resulted in the error.

15. An adapter as claimed in claim 11, wherein commands from the plurality of host systems other than the host system whose command resulted in the error continue to be converted by the adapter and executed by the data storage device during an error handling state.

16. A method as claimed in claim 11, wherein during an error handling state between the adapter and a first host system, only commands identified as executable from a first host system whose command resulted in an error are executed.

* * * * *